J. L. NORTON.
Dressing Millstones.
No. 109,928.
2 Sheets—Sheet 1.
Patented Dec. 6, 1870.
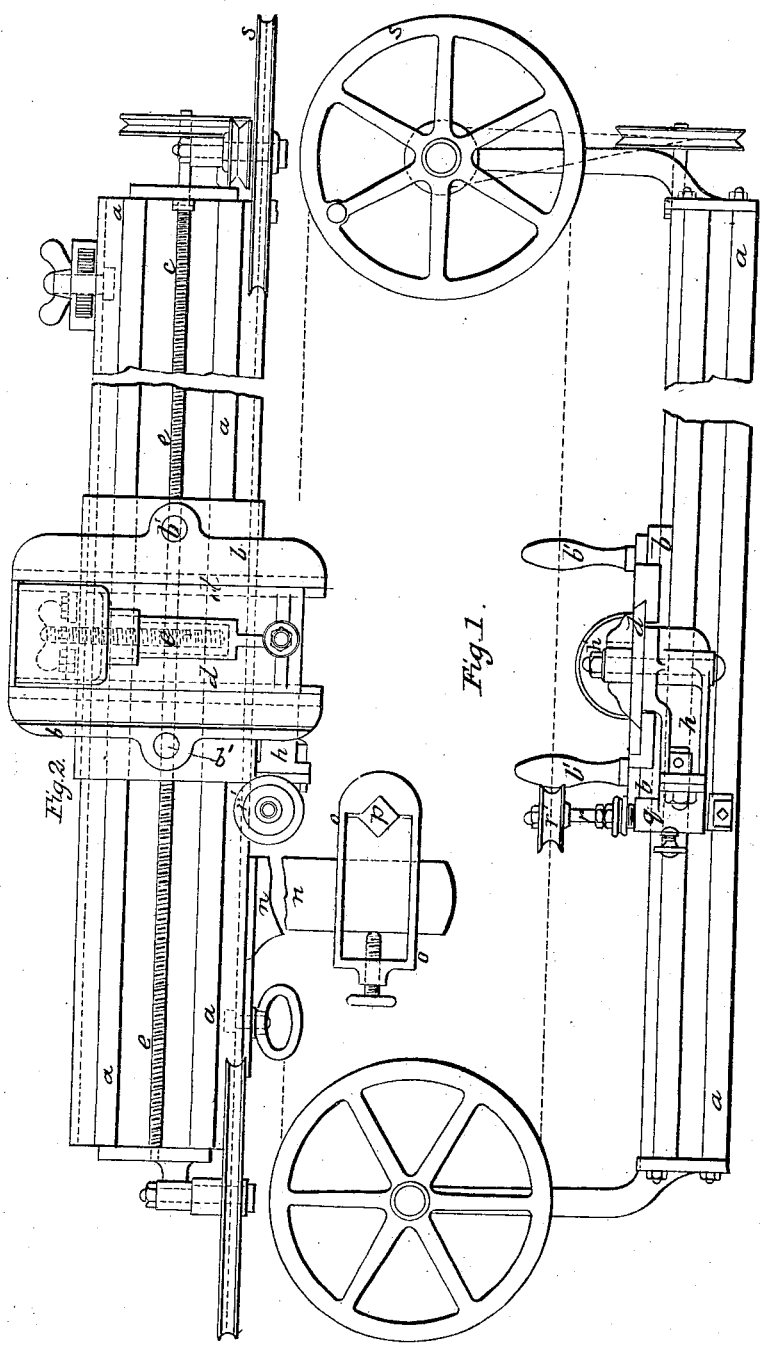

J. L. NORTON.
Dressing Millstones.
No. 109,928.
2 Sheets—Sheet 2.
Patented Dec. 6, 1870.
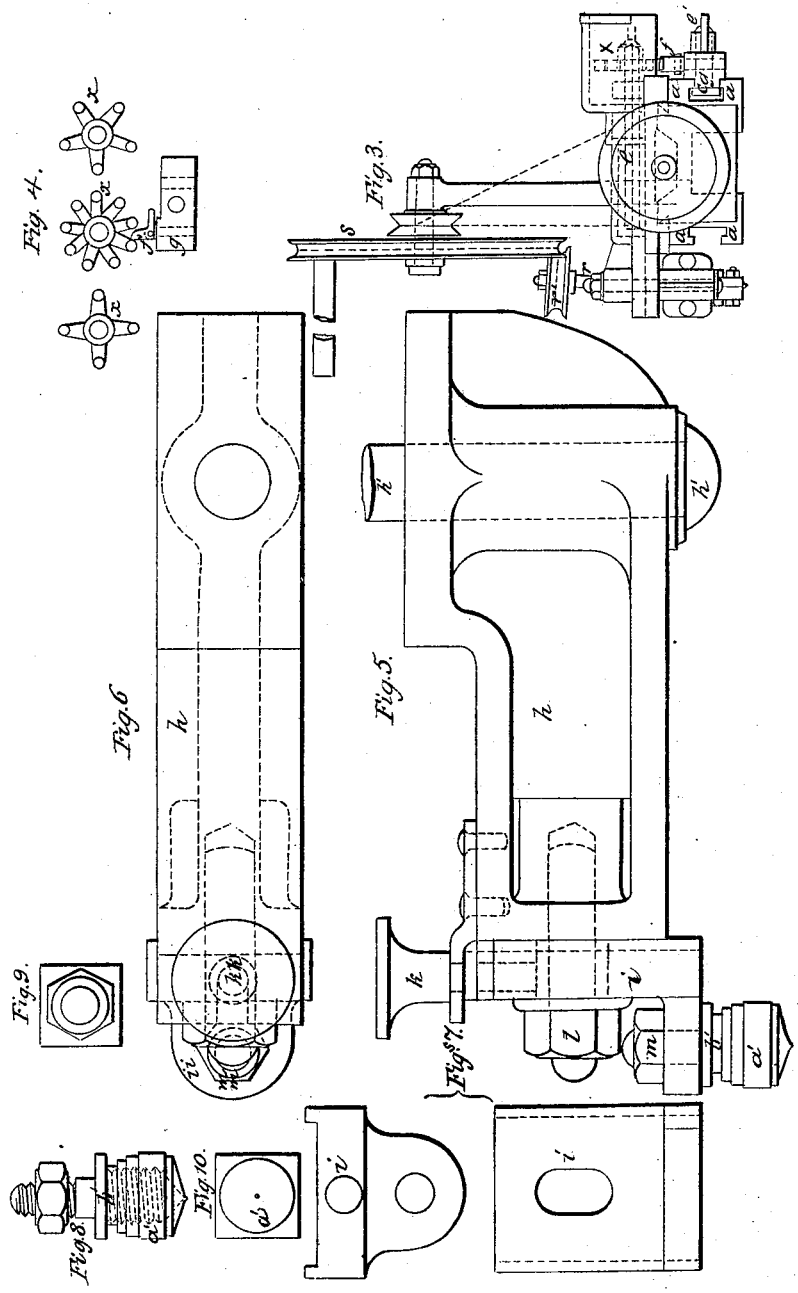

UNITED STATES PATENT OFFICE.

JAMES LEE NORTON, OF LONDON, ENGLAND.

IMPROVEMENT IN APPARATUS FOR DRESSING AND FURROWING MILLSTONES.

Specification forming part of Letters Patent No. 109,928, dated December 6, 1870.

*To all whom it may concern:*

Be it known that I, JAMES LEE NORTON, of Belle Sauvage Yard, Ludgate Hill, in the city of London, England, a subject of the Queen of Great Britain, have invented or discovered new and useful Improvements in Apparatus for Dressing and Furrowing Millstones; and I, the said JAMES LEE NORTON, do hereby declare the nature of the said invention, and in what manner the same is to be performed, to be particularly described and ascertained in and by the following statement thereof—that is to say:

This invention has for its object improvements in apparatus for dressing and furrowing millstones.

For this purpose I employ a metal staff, truly surfaced on its under side. This staff lies upon the stone to be operated upon. On the upper surface of the staff a saddle is mounted, which can be caused to travel from end to end of the staff in a straight line parallel to the flat surface on the under side of the staff. On the saddle is a cross-slide capable of being traversed across the staff by means of a screw on the saddle in a plane parallel with the flat under surface of the staff.

A carrier for holding the diamond, gem, or cutter is jointed to the cross-slide, and has a screw adjustment for setting the cutting-point to its proper working level.

The saddle has handles upon it, by means of which it is drawn to and fro along the staff, and then the diamond point cuts upon the surface of the stone the straight lines necessary to give the stone the roughness requisite for grinding.

The cross-slide is moved by its screw a short distance between each traverse, and for this purpose the screw has upon its end a wheel the teeth of which are operated on by a pawl mounted on the staff. To receive this pawl a socket-piece is employed, which, by a binding-screw, is capable of being clamped to the side of the staff at any point required, and when at work it is so set that as soon as the cutter has arrived at the end of its cut the wheel which actuates the cross-slide comes against the pawl, and is shifted round the space of one or more of its teeth. When the slide passes the pawl in the opposite direction, the pawl, being jointed to its stem, tips, and allows the wheel to pass without being rotated.

The socket-piece is made with two recesses to receive the stem of the slides. They are so arranged that when the pawl is in one recess it stands at such a height as to take the wheel round one tooth, and when in the other recess it stands higher, and then takes the wheel round two teeth at each action.

The jointed carrier for the cutter is capable of being fixed to the slide in either of two positions, so that the cutting-point may stand either in front of or behind the slide. This arrangement gives facility for getting at portions of the work which, in consequence of the stone to be operated on being situated in a confined space, might otherwise be difficult of approach.

Figure 1 is a side view, Fig. 2 a plan, and Fig. 3 an end view, of an apparatus thus constructed for dressing and furrowing millstones.

$a$ $a$ is the metal staff. Its sectional form is shown, partly by dotted lines, in Fig. 3. It is truly planed and surfaced on its under side, and has guides accurately formed on its upper surface to receive a saddle, $b$, which, by means of the handles $b'$ $b'$, may be slidden to and fro along the staff from end to end; or, when the apparatus is used for furrowing, a slow motion is given to the saddle by means of the screw $c$, working with a nut fitted into a nut-box on the under side of the saddle. When the machine is used for dressing, this screw, with some other of the parts shown in the drawing, is removed, the apparatus being represented as it is mounted for furrowing.

The saddle $b$ carries in guides the cross-slide $d$, which receives a motion in the guides by means of the screw $e$, mounted in a bearing on the saddle, and working with a nut fitted into a nut-box on the slide $d$. The screw has on its end a star-wheel, $x$, with four or other number of arms or teeth, which, as the slide is traversed to and fro to dress the stone, come against a pawl, $f$, Fig. 3, which moves the wheel the space of a tooth or more each time that the saddle is drawn past the pawl. The operation of the star-wheel and pawl is better seen in Fig. 4.

$g$ is the socket-piece into which the stem of the pawl is dropped. This socket-piece is clamped to the staff, in any position to suit the length of stroke required, by means of a T-headed bolt, $c'$, entering a groove in the side of the staff, as is shown in Fig. 3. There are two slots in the socket-piece, one higher than the other, to facilitate the adjustment of the height of the pawl to its proper working position. The pawl is hinged to its stem, so that it acts on the star-wheel only in one direction. When the wheel strikes it in the contrary direction the pawl tips on its joint and the star-wheel is not rotated.

The cross-slide $d$ has a carrier, $h$, clamped to it by means of a bolt, $h'$. This arm is shown full size, in side view, in Fig. 5, and in plan in Fig. 6. The end of the carrier $h$ is made to receive upon it the sliding tool-holder $i$, which is also shown separately in Fig. 7. It can receive a short vertical traverse by means of the screw $k$, to set the tool down so as to touch the stone, and it can then be clamped by the bolt $l$. The tool is fixed to the tool-holder by the screw and nut $m$, and, as the drawing represents, it consists of a screw-clamp, in which a cutting-diamond is nipped.

In the operation of furrowing the stone the staff is placed upon the stone in the proper position, and the saddle is drawn to and fro by hand, as already described. At each traverse the pawl acts on the star-wheel, and thereby shifts the cross-slide $d$ a short distance. In this way a number of fine parallel lines, close together, are produced upon the face of the stone. When the cross-slide $d$ has passed from end to end of its course the staff is moved to a fresh position.

In order to control any tendency there may be for the staff to slip upon the stone, I sometimes provide the staff with lever-feet. They are jointed underneath the staff and at their lower ends, which rest on the stone, but simply with their own weight. They are padded with vulcanized india-rubber. This material clings to the surface and effectually prevents movement.

To hold the cutting diamond, gem, or cutter, I form a metal cell with a perforation in the bottom of a size sufficient to allow the cutting-angle of the gem to project through. When the gem has been properly placed, I pour melted metal into the cell. The metal should be such as is readily fusible, and I prefer to employ metal which melts at the temperature of boiling water. The cell has a screw-thread formed within it, receiving a metal plug which is screwed down onto the fusible metal, so as firmly to compress it around the gem or cutter.

A side view of a tool in which the diamond is set in this manner is shown in Fig. 8, in plan in Fig. 9, and an under-side view is shown at Fig. 10. In these figures, $a'$ $a'$ is a metal cell, with a small hole at the bottom, and having a screw-thread cut within it.

The diamond is placed in the cell with its cutting-angle projecting through the hole at the bottom. Over the diamond fragments of fusible metal—a well-known alloy of bismuth, lead, and tin—are placed, and the cell is immersed in boiling water until the metal is melted. It is then allowed to cool, and the plug $b'$ is screwed down hard upon it, and so the diamond becomes securely held.

The plug $b'$ has a stem with a screw-thread upon it, which receives a nut to fix the tool to the tool-holder.

Sometimes I arrange the apparatus in such manner that the diamond is turned half round at each end of the stroke, so that it may cut both ways.

For some descriptions of work I connect the staff to an axis at the center of the stone by a radial arm fixed to the side of the staff, and controlling its position as it is moved over the face of the stone in such manner that the parts of the stone near the eye may be more worked than the parts distant from it. This arrangement is represented in the drawing, Fig. 2.

$n$ is an arm, clamped by a T-headed bolt to the side of the staff. It has upon it a slide, $o$, which can be set nearer to or farther from the staff, and which clips the spindle or axis $p$ at the center of the stone.

When using this arrangement, as each narrow band of dressing is completed, the staff is shifted round the spindle or axis. In this way the lines formed around the eye of the stone are caused to cross and recross each other, and so this part of the stone is reduced to a somewhat lower level than the skirt of the stone or parts near the circumference, as is sometimes required.

I will now describe the method in which the furrowing is accomplished: When the machine is to be used to furrow the stone, the tool-holder and cutter are removed and replaced by a piece, $q$, Figs. 1 and 2, in which is a bearing carrying an axis, $r$, which is slightly inclined, Fig. 5. This axis $r$, at its lower end, has a diamond or diamonds mounted eccentrically upon it, and at its upper end it carries a pulley, $r'$, around which a gut band passes. The band is driven by a hand-wheel, $s$, which is mounted on the staff when thus used. The saddle $b$ is slowly traversed along the staff during the operation of furrowing by a screw motion or otherwise.

In consequence of the inclination of the revolving cutting-point to its work, it only cuts on one side of its circular orbit, forming, as the slide traverses, a straight groove or furrow with an inclined bottom.

The axis may be set either so that the bottom of the furrow shall be flat or concave. The latter is preferred.

Having thus described the nature of my invention, and the manner of performing the same, I would have it understood that I claim—

1. The combination, with the grooved staff $a$, provided with the saddle $b$, cross-slide $d$, jointed carrier $h$, adjusting-slide $i$, screw-shaft $e$, of the star or ratchet wheel and jointed pawl $f$, substantially as shown and described, and for the purpose of dressing the face of a millstone.

2. The combination, with the staff $a$, provided with the saddle $b$, cross-slide $d$, jointed carrier $h$, screw-shaft $e$, star-wheel, and jointed pawl $f$, of the inclined axis or spindle $r$, provided with pulley $r'$, pulleys $s'$ on upright standards attached to the ends of the staff, and the driving belt or cord, substantially as and for the purpose specified.

J. L. NORTON.

Witnesses:
   WILMER M. HARRIS,
   THOMAS LAKE,
*Both of No. 17 Gracechurch Street, London.*